United States Patent Office

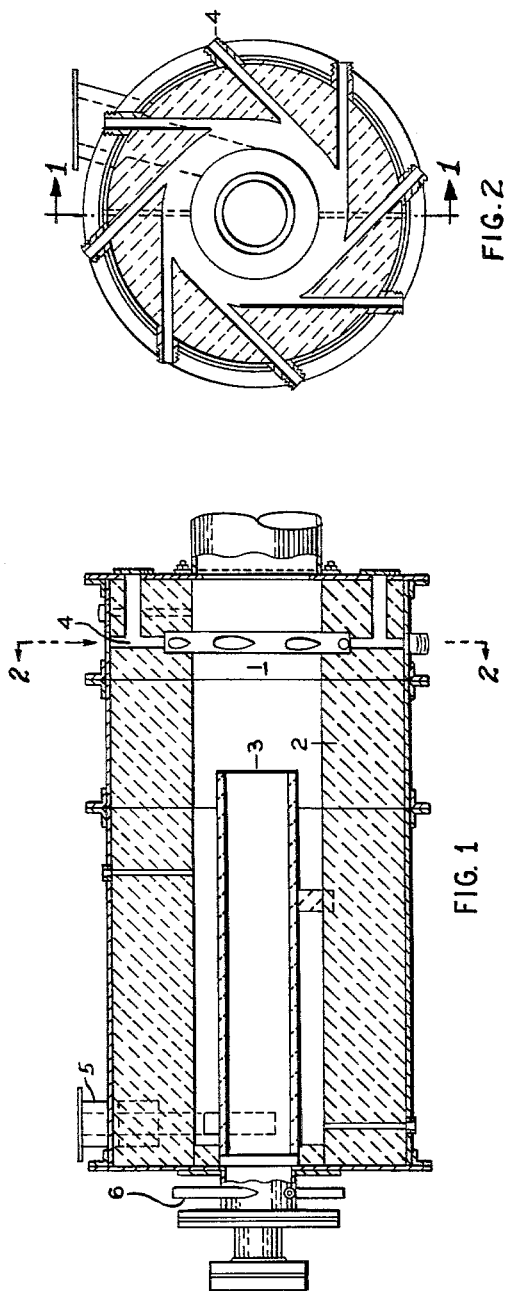
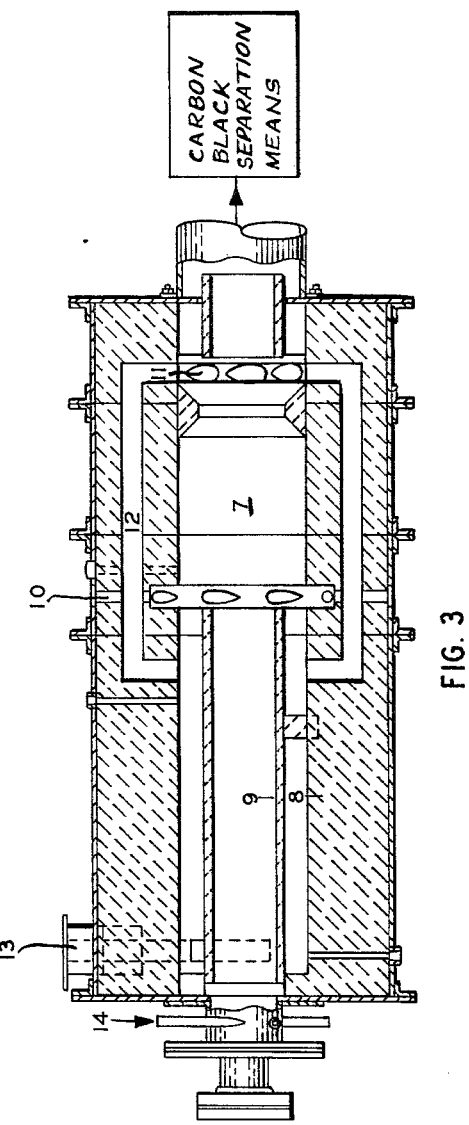

3,230,049
Patented Jan. 18, 1966

3,230,049
CARBON BLACK FURNACE
Edward A. Erickson, Terre Haute, Ind., assignor to Commercial Solvents Corporation, New York, N.Y., a corporation of Maryland
Filed July 6, 1961, Ser. No. 122,133
4 Claims. (Cl. 23—259.5)

My invention relates to a process for the production of carbon black, and more particularly my invention relates to a process and an apparatus for the production of carbon black from hydrocarbons.

Carbon black of high grade can be produced by introducing a reactant hydrocarbon ordinarily called "the make gas" preferably in vapor form into the interior of a helically moving sheath of hot combustion gases. The direct transfer of heat from the combustion gases to the reactant hydrocarbon then heats the hydrocarbon to a carbon black forming temperature. This process causes partial combustion of the make gas and mixing of the make gas with the combustion gas. After mixing, the combined gases are quenched and carbon black is recovered therefrom.

Even though the above process produces high grade carbon blacks, several drawbacks arise from its use. For instance, expensive and large recovery units are needed to handle the large volume of gases containing the produced carbon black which come from the mixing of combustion gases and make gases of the process. Also, all heat formed from the process is lost due to the necessity to quench the gases to recover the carbon black.

Using the apparatus of my invention I am able to substantially avoid mixing of combustion gases thereby greatly reducing recovery problems. I am also able, when employing my apparatus, to utilize the heat from the combustion gases for preheating of make gases thus not only producing great economies in the production of carbon black but allowing more economical operation by utilization of a continuous process.

The apparatus of my invention comprises a substantially cylindrical combustion chamber having outlet means and having inlet means substantially tangentially positioned with respect to the inner wall of the said combustion chamber, a substantially cylindrical refractory tube shorter than, in communication with one end with and positioned within said combustion chamber, the said refractory tube having inlet means tangentially positioned with respect to the inner wall of the said refractory tube, and a recovery means positioned at the end of the combustion chamber which is in communication with the refractory tube, the said recovery means being in communication with the said combustion chamber.

In the primary embodiment of my apparatus, the inlet means to the combustion chamber is positioned at the point farthest downstream at the end of the combustion chamber in communication with the refractory tube. In a modified embodiment of my apparatus, the inlet means to the combustion chamber is positioned at the terminating point of the open end of the refractory tube.

Carbon black is prepared in the primary embodiment of my apparatus by passing into the combustion chamber through tangential inlet means, hot combustion gases at velocities not lower than sonic velocity to form a sheath of helically moving gases. Concurrently preheated make gases are introduced by means of tangential inlet means into the refractory tube at a velocity also not lower than sonic velocity to form a second sheath of helically moving gases, the said make gases rotating in the same circular direction as the combustion gases but moving in an axial direction opposite to the combustion gases. The swirling make gases, while in the refractory tube, are heated by contact with the refractory material which is in turn heated by the combustion gases passing over the refractory tube. Upon leaving the refractory tube, the swirling make gases ride spirally inside the hot combustion gases which, as previously stated, are revolving in the same circular direction but are moving in an opposite axial direction and then pass to the carbon black recovering means. Carbon black formation temperatures are realized by the make gases upon passing from the refractory tube by radiation and convection from the combustion gases and frictional contact with the combustion gases yet only a very small amount of mixing takes place between the two bodies of gases. The hot combustion gases, after passage over the refractory tube, are removed by an outlet means and then can be utilized for preheating other gases to be used in the process.

In the alternate embodiment of my apparatus, carbon black is prepared using essentially the same procedure as used in my primary apparatus with the exception that the combustion gases move in the same axial direction as the make gases. The combustion gases, before reaching the recovery means, are channeled by means of an outlet so as to allow their passage over the refractory tube for heating purposes.

One embodiment of my invention is further described and illustrated by reference to the following drawings:

FIGURE 1 is a vertical cross section of the furnace along lines 2—2 of FIGURE 2.

FIGURE 2 is a horizontal cross section of the furnace taken along lines 1—1 of FIGURE 1.

The alternate embodiment of my invention is further described and illustrated by reference to the following drawing:

FIGURE 3 is a vertical cross section of the furnace.

The primary embodiment of my apparatus consists of a substantially circular furnace 1 having a heat resistant refractory lining 2, a refractory tube 3, open on one end and positioned away from the heat resistant refractory lining. Preheated combustion gases are admitted tangentially at a velocity not less than sonic velocity via the inlet means 4, and thus form a helically moving sheath flowing in a direction so as to pass between the heat resistant refractory wall and the refractory tube and out through a gas flue 5 into a preheater which is not shown. Preheated make gases concurrently are admitted tangentially at velocities not less than sonic velocity through the inlet means 6 and form a helically moving sheath of gases which pass through the refractory tube. Ordinarily, temperatures within the refractory tube are about 2,500° F. when my apparatus is in operation. The make gases are heated and spirally passed from the refractory tube through the combustion gases into a carbon black separatory means which is not shown. Any carbon separatory means suitable to the art may be used. During passage through the combustion gases, the make gases are heated to carbon black forming temperatures ordinarily ranging from 2,600–2,700° F.

The alternate embodiment of my apparatus consists of a substantially circular furnace 7, having a heat resistant refractory lining 8, a refractory tube 9 open on one end and positioned away from the heat-resistant refractory lining. Preheated combustion gases are admitted tangentially via the inlet means 10, at speeds not less than sonic velocity to form a helically moving sheath of gases flowing away from the open end of the refractory tube out through an opening 11. The gases then proceed through a flue gas duct 12 then pass between the heat resistant refractory walls and the refractory tube and finally pass out through a gas flue 13 into a preheater of any desired design, which is not shown. Preheated make gases are concurrently tangentially admitted at a speed not less than sonic velocity through the inlet means 14 to form in the refractory tube a helically moving sheath of gases which pass from the refractory tube through the swirling combustion gases to form carbon black. The thus formed carbon black-make gas mixture then passes into the carbon black separatory means, which is not shown.

The apparatus of my invention may be of any desired size. Since carbon black can be made continuously in my apparatus, it is not necessary to have a particularly large furnace.

The furnace lining of my apparatus must be made of a temperature resistant refractory material such as aluminum oxide or graphite due to the extreme temperatures required in forming carbon black. In order not to impede the velocity of the swirling gases and to prevent deposition in the furnace lining and the refractory tube, it is preferable to use refractory material having a smooth surface. In order to prolong the useful life of the refractory tube, it is also desirable to coat the outside of the tube with an oxygen resistant material such as silicon carbide or silicon nitride.

The present invention is not limited to any particular number of injection nozzles for inlet means as shown in FIGURE 2; but it is generally preferable to provide at least four nozzles at each inlet position in order to supply an adequate amount of gas to the apparatus.

Generally, when preparing carbon black in the furnace of my invention, the furnace is preheated preferably by passing combustion gases in the manner prescribed in my process through the furnace until the desired temperatures are reached. Generally, it is preferable to have a temperature of about 2,500° F. within the refractory tube before beginning operation of my apparatus. The combustion gases utilized in my process are not limited to any particular ratio of air to hydrocarbon. Generally, however, I prefer to utilize between eight to twelve volumes of air for each volume of hydrocarbon. If oxygen is utilized instead of air, naturally it is desirable to reduce this ratio.

In connection with the preheating of the combustion gases and/or the make gases, it is obvious that with preheating, more complete combustion of combustion gases is later realized and more complete cracking of the make gases will occur. The used combustion gases, as previously stated, can be further utilized for preheating either make gases or unutilized combustion gases. This purpose may be accomplished in any well-known manner.

In preparing carbon black by my process it is necessary also to not only introduce the combustion gases and make gases into the furnace in a tangential manner, but it is necessary to also introduce them at velocities not less than sonic velocity in order to prevent unnecessary mixing of gases and to obtain temperatures necessary for carbon formation.

Now having described my invention, what I claim is:

1. A carbon black production reactor comprising in combination, a substantially cylindrical combustion gas chamber, a substantially cylindrical refractory tube having one end positioned within said combustion gas chamber, said refractory tube being smaller in outer diameter than the inner diameter of said combustion gas chamber and spaced apart from the walls of said combustion gas chamber to define an annular space therebetween, said refractory tube being shorter than said combustion gas chamber and said one end being in communication with said combustion gas chamber, make-gas inlet means for introducing make-gas into said refractory tube tangentially with respect to the interior surface of said tube positioned adjacent the other end of said refractory tube which other end is not in communication with the combustion gas chamber, combustion gas inlet means for introducing combustion gas into said combustion gas chamber tangentially with respect to the interior surface of said combustion gas chamber positioned in the end of the combustion gas chamber in communication with the refractory tube, combustion gas outlet means for removing said combustion gas from said combustion gas chamber positioned in said annular space at the end of the combustion gas chamber not in communication with the refractory tube, and carbon black recovery means including carbon black separatory means and a second tube connected to said carbon black separatory means and in communication with said combustion gas chamber, said second tube being arranged axially of said combustion gas chamber at the end thereof in communication with said refractory tube.

2. A carbon black production reactor comprising in combination, a substantially cylindrical combustion gas chamber, a substantially cylindrical refractory tube having one end positioned within said combustion gas chamber, said refractory tube being smaller in outer diameter than the inner diameter of said combustion gas chamber and spaced apart the walls of said combustion gas chamber to define an annular space therebetween, said refractory tube being shorter than said combustion gas chamber, make-gas inlet means for introducing make-gas into said refractory tube tangentially with respect to the interior surface of said tube positioned adjacent the other end of said refractory tube which other end is not in communication with the combustion gas chamber, combustion gas inlet means for introducing combustion gas into said combustion gas chamber tangentially with respect to the interior surface of said combustion gas chamber positioned adjacent said one end of the refractory tube, passage means connecting said annular space and the end of said combustion gas chamber in communication with the refractory tube downstream of said combustion gas inlet means, combustion gas outlet means for removing said combustion gas from said combustion gas chamber positioned in said annular space at the end of the combustion gas chamber not in communication with the refractory tube, and carbon black recovery means including carbon black separatory means and a second tube connected to said separatory means and in communication with said combustion gas chamber, said tube being arranged axially of said combustion gas chamber at the end thereof in communication with said refractory tube.

3. The apparatus of claim 1 wherein the outer surface of the refractory tube is coated with an oxygen resistant material.

4. The apparatus of claim 2 wherein the outer surface of the refractory tube is coated with an oxygen resistant material.

References Cited by the Examiner
UNITED STATES PATENTS

| | | | |
|---|---|---|---|
| 2,546,042 | 3/1951 | Oberfell et al. | 48—196 X |
| 2,877,717 | 3/1959 | Reed | 23—259.5 |
| 3,015,543 | 1/1962 | Frey | 23—259.5 X |
| 3,076,695 | 2/1963 | Claassen et al. | 32—209.4 |

MORRIS O. WOLK, *Primary Examiner.*

MAURICE A. BRINDISI, *Examiner.*